US008829860B2

(12) United States Patent
Sone et al.

(10) Patent No.: US 8,829,860 B2
(45) Date of Patent: Sep. 9, 2014

(54) POWER STORAGE APPARATUS

(75) Inventors: Mitsuo Sone, Chiyoda-ku (JP);
Nobuhiro Kihara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 391 days.

(21) Appl. No.: 13/272,377

(22) Filed: Oct. 13, 2011

(65) Prior Publication Data

US 2012/0293137 A1 Nov. 22, 2012

(30) Foreign Application Priority Data

May 18, 2011 (JP) ................................. 2011-110999

(51) Int. Cl.
*H02J 7/00* (2006.01)
*B60L 11/00* (2006.01)
*H02J 7/14* (2006.01)
*H02J 7/34* (2006.01)

(52) U.S. Cl.
CPC ............ *B60L 11/005* (2013.01); *Y02T 10/7022* (2013.01); *H02J 7/1492* (2013.01); *H02J 7/1438* (2013.01); *H02J 7/345* (2013.01)
USPC ....................................................... 320/166

(58) Field of Classification Search
USPC ................................................. 320/166, 167
See application file for complete search history.

(56) References Cited

U.S. PATENT DOCUMENTS

| 4,145,638 A | * | 3/1979 | Kaneda | 315/323 |
| 5,119,010 A | * | 6/1992 | Shirata et al. | 320/110 |
| 6,075,331 A | * | 6/2000 | Ando et al. | 318/376 |
| 6,646,851 B1 | * | 11/2003 | Gudat | 361/160 |
| 6,995,480 B2 | * | 2/2006 | Amano et al. | 307/10.1 |
| 2002/0158513 A1 | | 10/2002 | Amano et al. | |

FOREIGN PATENT DOCUMENTS

| JP | 9-252528 A | 9/1997 |
| JP | 2002-325377 A | 11/2002 |
| JP | 2008-043103 A | 2/2008 |
| JP | 2009-095209 A | 4/2009 |

OTHER PUBLICATIONS

Japanese Office Action dated Jul. 2, 2013 of corresponding Japanese Patent Application No. 2011-110999.
Japanese Office Action (Notice of Reasons for Rejection), Apr. 9, 2013; Patent Application No. 2011-110999.

* cited by examiner

*Primary Examiner* — Edward H Tso
*Assistant Examiner* — Ramy Ramadan
(74) *Attorney, Agent, or Firm* — Sughrue Mion, PLLC

(57) ABSTRACT

A power storage apparatus provided with a capacitor module and a power storage control circuit is connected between a generator and an electrical load. The capacitor module includes a plurality of capacitors and a plurality of switching devices which are connected in series with the capacitors, respectively, the capacitors and the switching devices together constituting a plurality of series circuits which are connected parallel to each other. When starting up the generator, the power storage control circuit controls only the specified switching device to become ON in order to quickly charge the capacitor which is connected in series with the switching device so that a voltage of the capacitor module is increased and a power source for starting up the generator is produced as high speed.

10 Claims, 5 Drawing Sheets

POWER STORAGE APPARATUS

BACKGROUND OF THE INVENTION

1. Field of the Invention

The present invention relates to a power storage apparatus connected between a generator and an electrical load and, in particular, the invention pertains to a power storage apparatus provided with a capacitor module including a plurality of capacitors.

2. Description of the Background Art

Motor vehicles featuring an idle stop and start function which stops an engine when a vehicle is stopped and an electric power steering system for reducing an engine load are used in recent years from a viewpoint of environmental considerations and an improvement in fuel economy. Also, systems like a hybrid system capable of positively providing an additional driving force to an engine and a regenerative braking system aimed at restoring kinetic braking energy produced when the vehicle is braked in the form of electrical energy currently receive much attention. As will be recognized from the above, there is a growing tendency today that the motor vehicles are required to make use of a larger amount of electric power. To cope with this tendency, recently proposed systems include large-capacitance capacitors, such as electric double-layer capacitors, that can be quickly charged and discharged.

A conventional power storage apparatus in which a plurality of capacitors are series/parallel-connected are provided with connection changing means for changing series/parallel connections of the capacitors. The connection changing means reconfigures the series/parallel-connected capacitors in such a way as to increase the number of series-connected capacitors during quick charge operation and to increase the number of parallel-connected capacitors during normal charge operation (refer to Japanese Laid-open Patent Application No. 1991-252528, for example).

A power storage apparatus connected between a generator and an electrical load starts up the generator by applying a voltage fed from the power storage apparatus to the generator at startup thereof. If the voltage of the power storage apparatus is low, however, it is necessary to produce a power source for starting up the generator by charging capacitors of the power storage apparatus. In this case, it is required to quickly charge the capacitors of the power storage apparatus in order to start up the generator. Although it would be possible for the aforementioned conventional power storage apparatus to quickly charge the capacitors upon increasing the number of the series-connected capacitors, there has been a problem that the capacitors would deteriorate to a large extent because all of the capacitors should be quickly charged and discharged.

SUMMARY OF THE INVENTION

The present invention has been made to overcome the aforementioned problem. Accordingly, it is an object of the invention to provide a power storage apparatus which makes it possible to produce a power source for starting up a generator at high speed while preventing deterioration of a plurality of capacitors as a whole, thus providing a long operational life of the power storage apparatus.

According to the invention, a power storage apparatus is connected between a generator and an electrical load. The power storage apparatus is provided with a capacitor module including a plurality of capacitors and a plurality of switching devices which are connected in series with the capacitors, respectively, the capacitors and the switching devices together constituting a plurality of series circuits which are connected parallel to each other, as well as a power storage control circuit which controllably drives the individual switching devices according to a voltage of the capacitor module and controls the capacitor module to store electric power.

Since the power storage apparatus of the invention can control the capacitors to charge and discharge electric power by controllably driving the individual switching devices, it is possible to selectively cause the plurality of capacitors to perform charging and discharging operations. Therefore, it is possible to produce a power source for starting up the generator while preventing deterioration of the plurality of capacitors as a whole and lengthen the operational life of the power storage apparatus.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

As an example of a power storage apparatus according to a first embodiment of the present invention, a power storage apparatus 10 used for producing a power source for various kinds of electronic devices installed on a vehicle, for instance, is first described below with reference to the drawings.

Figure 1:
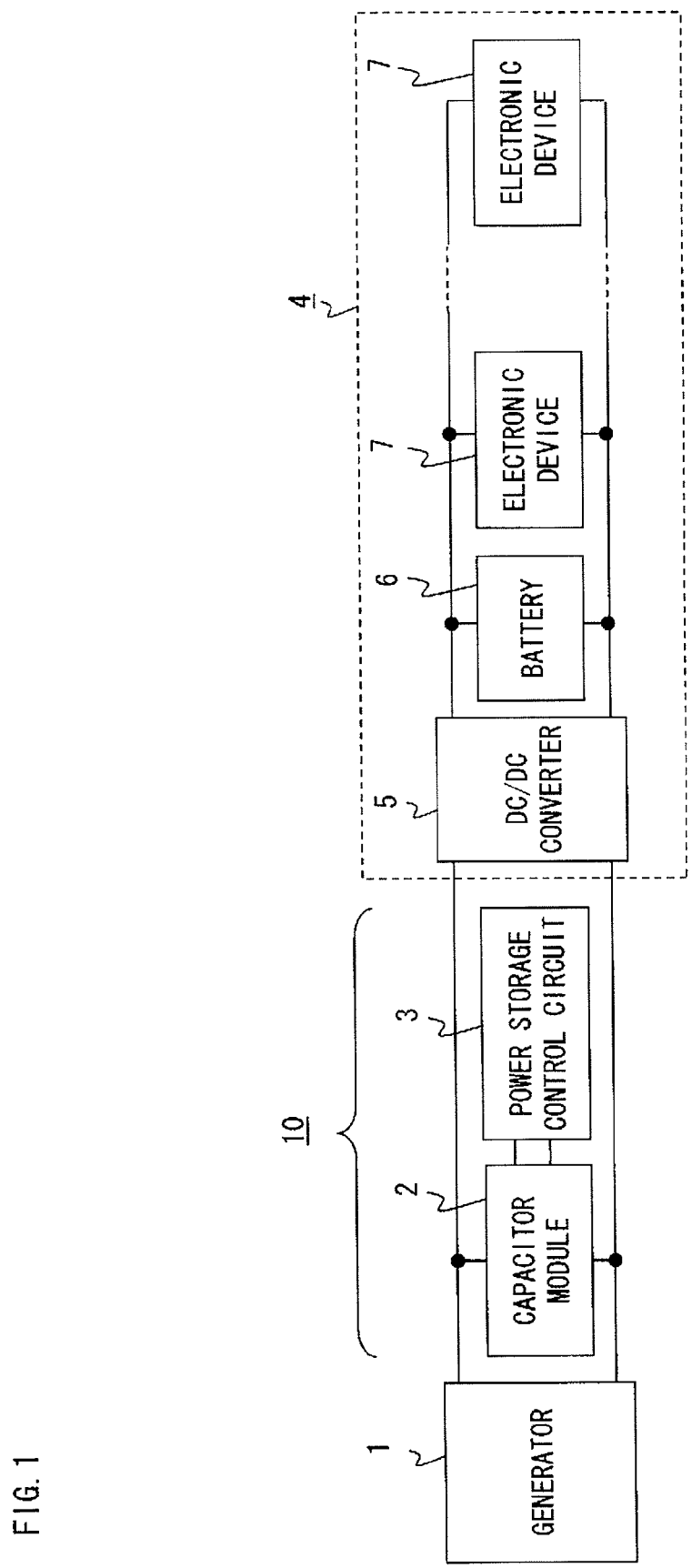
FIG. 1 is a general configuration diagram depicting a power storage apparatus according to a first embodiment of the invention together with peripheral devices thereof.

FIG. 1 is a general configuration diagram of a system including the power storage apparatus 10 and peripheral devices. The power storage apparatus 10 which is connected between a generator 1 and an electrical load 4 includes a capacitor module 2 and a power storage control circuit 3 for controlling the capacitor module 2. As depicted in FIG. 1, the electrical load 4 includes a DC/DC converter 5, a battery 6 connected to the DC/DC converter 5 and various kinds of electronic devices 7 connected to the DC/DC converter 5. Incidentally, a motor for providing a driving force to the vehicle may be used as the generator 1.

Figure 2:
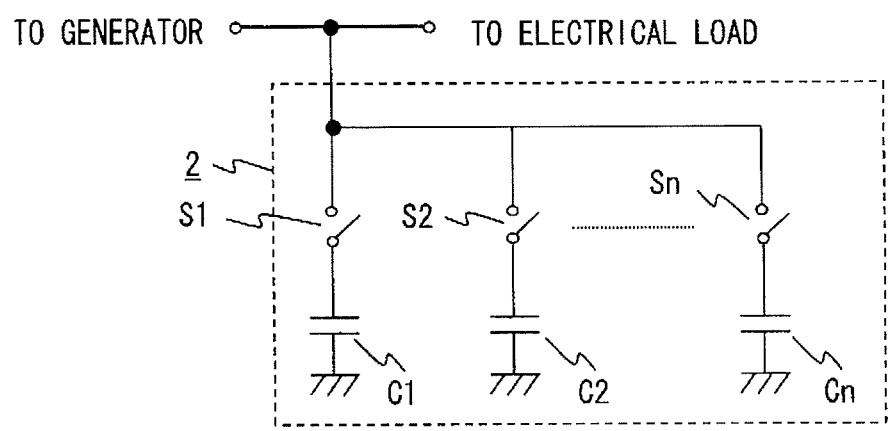
FIG. 2 is a diagram depicting the configuration a capacitor module according to the first embodiment.

The capacitor module 2 includes a plurality of capacitors C1-Cn and a plurality of switching devices S1-Sn connected in series with the capacitors C1-Cn, respectively, as depicted in FIG. 2. Capacitors like electric double-layer capacitors each having a large capacitance and quick charging and discharging capability are used as the capacitors C1-Cn, and the capacitors C1-Cn and the switching devices S1-Sn together constitute a plurality of series circuits which are connected parallel to each other.

The power storage control circuit 3 detects a voltage of the capacitor module 2 and controllably drives the individual switching devices S1-Sn of the capacitor module 2 according to the detected voltage. The power storage control circuit 3 controls part (one in this embodiment) of the switching devices S1-Sn as a startup switching device S1 in a way different from the other switching devices S2-Sn.

Figure 3:
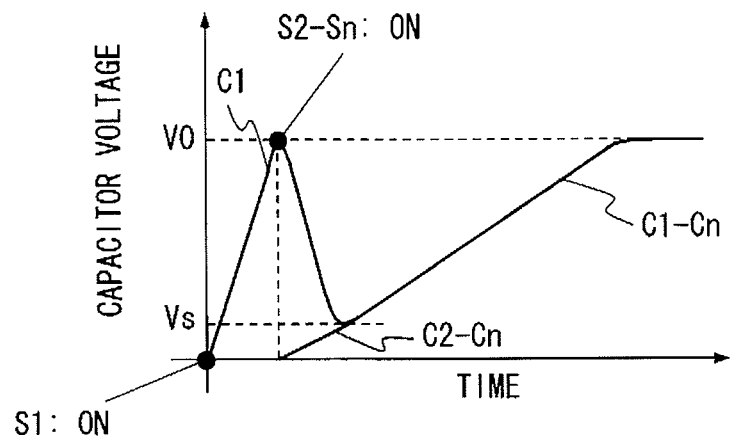
FIG. 3 is an operating characteristic diagram of the power storage apparatus according to the first embodiment.

Now, the working of the power storage apparatus 10 is described with reference to FIG. 3 which depicts time-related variations of voltages of the individual capacitors C1-Cn at startup of the generator 1.

If the voltage of the capacitor module 2 is lower than a specific voltage, that is, a startup voltage Vs of the generator 1, for example, when starting up the generator 1, the power storage control circuit 3 controls only the startup switching device S1 to become ON and the remaining switching devices S2-Sn to become OFF. As a result, the battery 6 of the electrical load 4 charges only the capacitor C1 of the capacitor module 2, giving first priority to the capacitor C1 over the other capacitors C2-Cn. Therefore, it is possible to more quickly charge the capacitor C1 compared to a case where the large number of capacitors C1-Cn are simultaneously charged. This causes the voltage of the capacitor module 2 (voltage of the capacitor C1 in this case) to quickly rise up to the startup voltage Vs of the generator 1, thus producing a startup power source for starting the generator 1.

When the generator 1 is driven to operate subsequently, electric power output from the generator 1 is first charged into the capacitor C1. Then, when the voltage of the capacitor C1 becomes equal to or higher than the aforementioned specific voltage, the power storage control circuit 3 controls the remaining switching devices S2-Sn to become ON, at which point all of the switching devices S1-Sn are turned on. Consequently, the power storage apparatus 10 controls all of the capacitors C1-Cn of the capacitor module 2 to perform charging and discharging operations.

While the foregoing discussion has illustrated a case in which the switching devices S2-Sn turn on when the voltage of the capacitor C1 has reached an upper limit charging voltage V0 (refer to FIG. 3), the aforementioned specific voltage may be a voltage lower than the upper limit charging voltage V0.

In this embodiment, the power storage control circuit 3 controls only the startup switching device S1 to become ON at startup of the generator 1 so that the capacitor C1 connected in series with the startup switching device S1 is first charged from the electrical load 4 with first priority given to the capacitor C1 and the startup power source for the generator 1 is produced. This arrangement enables the power storage control circuit 3 to produce the startup power source for the generator 1 at high speed by quickly charging the capacitor C1 alone. Also, because the remaining capacitors C2-Cn are not charged in the beginning, the above-described arrangement serves to prevent deterioration of the capacitors C2-Cn, making it possible to prevent deterioration of the capacitor module 2 as a whole and lengthen the operational life of the power storage apparatus 10.

Furthermore, when the generator 1 is driven to operate subsequently, the power storage control circuit 3 controls all of the switching devices S1-Sn to become ON, thereby increasing the number of the parallel-connected capacitors C1-Cn. This serves to increase an overall capacitance of the capacitor module 2, making it possible to perform large-capacity charging and discharging operations.

It is to be noted that the startup switching device need not necessarily be the switching device S1 at all times. For instance, the power storage control circuit 3 may selectively specify the startup switching device from among the switching devices S1-Sn at specific time intervals. This modified arrangement will serve to deter deterioration of all of the capacitors C1-Cn and further prevent deterioration of the entire capacitor module 2.

It should be pointed out however that although the capacitor C1 may deteriorate more quickly than the other capacitors C2-Cn if the switching device S1 is designated to be used as the startup switching device at all times, it is possible to lengthen the operational life of the power storage apparatus 10 by replacing only the capacitor C1 when the capacitor C1 has deteriorated.

Second Embodiment

Figure 4:
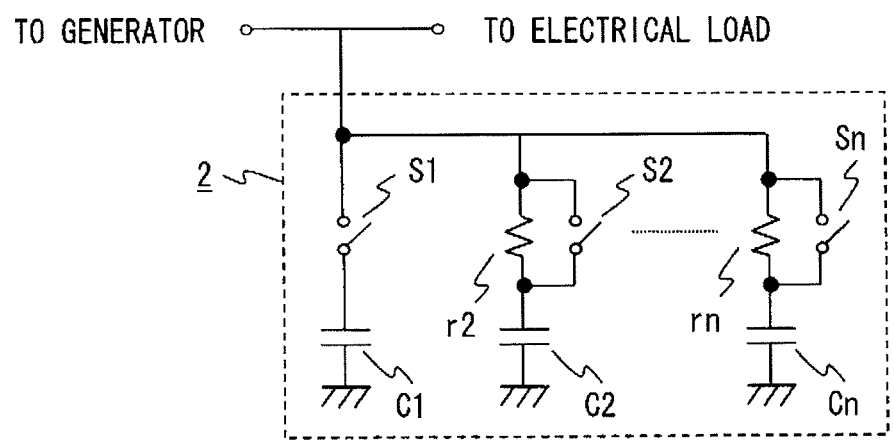
FIG. 4 is a diagram depicting the configuration of a capacitor module according to a second embodiment of the invention.

A power storage apparatus 10 according to a second embodiment of the invention is now described. FIG. 4 is a diagram depicting the configuration of a capacitor module 2 of the power storage apparatus 10 according to the second embodiment. The power storage apparatus 10 of the second embodiment has otherwise the same configuration as that of the first embodiment depicted in FIG. 1.

The capacitor module 2 includes a plurality of capacitors C1-Cn and a plurality of switching devices S1-Sn connected in series with the capacitors C1-Cn, respectively, as depicted in FIG. 4. Capacitors like electric double-layer capacitors each having a large capacitance and quick charging and discharging capability are used as the capacitors C1-Cn, and the capacitors C1-Cn and the switching devices S1-Sn together constitute a plurality of series circuits which are connected parallel to each other. Among the switching devices S1-Sn, the switching device S1 is designated as a startup switching device, and resistor elements r2-rn are connected parallel to the other switching devices S2-Sn, respectively.

Figure 5:
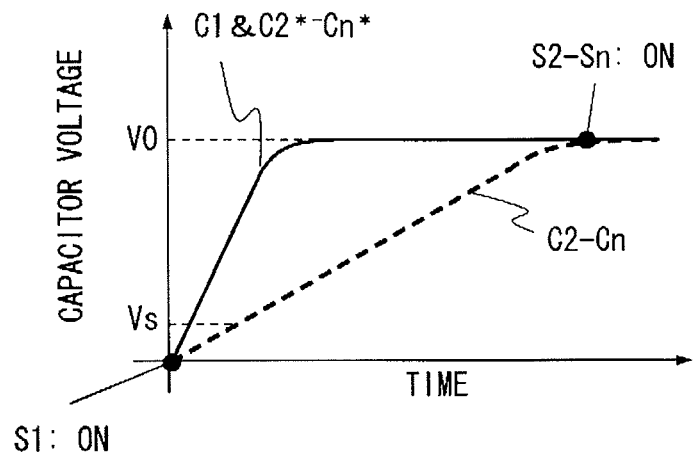
FIG. 5 is an operating characteristic diagram of a power storage apparatus according to the second embodiment.

Now, the working of the power storage apparatus 10 is described with reference to FIG. 5 which depicts time-related variations of voltages of the individual capacitors C1-Cn at startup of the generator 1.

The power storage control circuit 3 of the second embodiment operates in a manner similar to that of the first embodiment. Specifically, the power storage control circuit 3 detects a voltage of the capacitor module 2 and controllably drives the individual switching devices S1-Sn of the capacitor module 2 according to the detected voltage, wherein the startup switching device S1 and the other switching devices S2-Sn are controlled in different ways. If the voltage of the capacitor module 2 is lower than a specific voltage, that is, the startup voltage Vs of the generator 1, for example, when starting up the generator 1, the power storage control circuit 3 controls only the startup switching device S1 to become ON and the remaining switching devices S2-Sn to become OFF.

As a result, the individual capacitors C1-Cn are charged from the electrical load 4. In this embodiment, the capacitor C1 connected in series with the startup switching device S1 is quickly charged while the other capacitors C2-Cn are gradually charged by currents limited by the respective resistor elements r2-rn. For the sake of explanation, voltages across series circuits made up of the capacitors C2-Cn and the respective resistor elements r2-rn are now referred to as "virtual voltages" C2*-Cn*. Even if the amounts of charges held by the capacitors C2-Cn are small, it is possible to increase the virtual voltages C2*-Cn* as quickly as the capacitor C1 because the virtual voltages C2*-Cn* include voltage drops caused by the resistor elements r2-rn. Therefore, as is the case with the first embodiment, it is possible to cause voltages of the capacitor module 2 (voltages C2*-Cn* and the voltage of the capacitor C1 in this case) to quickly rise up to the startup voltage Vs of the generator 1, thus producing a startup power source for starting the generator 1.

When the generator 1 is driven to operate subsequently, electric power output from the generator 1 is charged into the individual capacitors C1-Cn. Then, when the voltages of the capacitor module 2 become equal to or higher than the aforementioned specific voltage, the power storage control circuit 3 controls the remaining switching devices S2-Sn to become ON, at which point all of the switching devices S1-Sn are turned on. Consequently, the power storage apparatus 10 performs charging and discharging operations using all of the capacitors C1-Cn of the capacitor module 2 in a like fashion.

It is preferable that the switching devices S2-Sn be turned on after the voltages of the respective capacitors C2-Cn have risen up to a level approximately equal to the voltage of the capacitor C1. For this purpose, the power storage control circuit 3 controls the individual switching devices S2-Sn by detecting the voltages of the capacitors C1-Cn.

In this embodiment, the power storage control circuit 3 controls only the startup switching device S1 to become ON at startup of the generator 1 so that the capacitor C1 connected in series with the startup switching device S1 is quickly charged from the electrical load 4 with first priority given to the capacitor C1 and the other capacitors C2-Cn are gradually charged through the respective resistor elements r2-rn. This arrangement makes it possible to quickly increase the voltages of the capacitor module 2 and produce the startup power source for the generator 1 at high speed. Also, because the capacitors C2-Cn to which the resistor elements r2-rn are connected, respectively, hold smaller amounts of charges, the above-described arrangement of the embodiment serves to deter deterioration of the capacitors C2-Cn, making it possible to prevent deterioration of the capacitor module 2 as a whole and lengthen the operational life of the power storage apparatus 10.

Furthermore, when the generator 1 is driven to operate subsequently, the power storage control circuit 3 controls all of the switching devices S1-Sn to become ON, thereby increasing the number of the parallel-connected capacitors C1-Cn. This serves to increase an overall capacitance of the capacitor module 2, making it possible to perform large-capacity charging and discharging operations. When the switching devices S2-Sn are turned from an OFF state to an ON state, the capacitors C2-Cn are already charged to a certain extent. Therefore, the arrangement of the present embodiment can bring the capacitor module 2 to a stably charged condition more quickly than in the earlier-described first embodiment.

Third Embodiment

Figure 6:
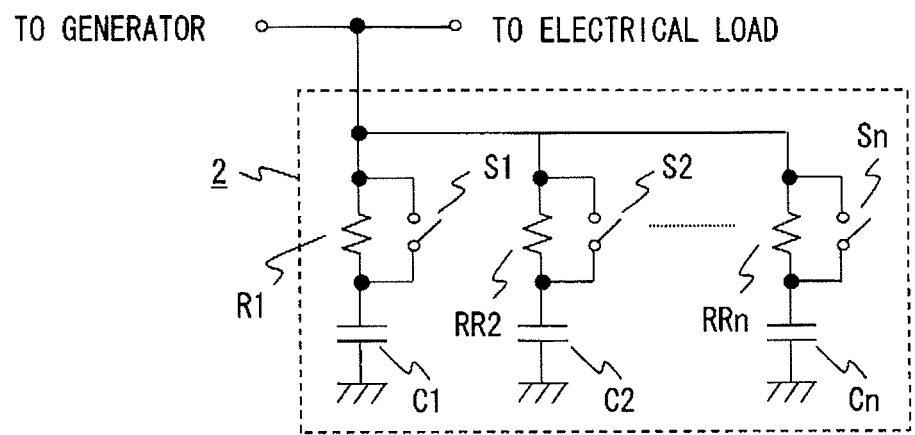
FIG. 6 is a diagram depicting the configuration of a capacitor module according to a third embodiment of the invention.

A power storage apparatus 10 according to a third embodiment of the invention is now described. FIG. 6 is a diagram depicting the configuration of a capacitor module 2 of the power storage apparatus 10 according to the third embodiment. The power storage apparatus 10 of the third embodiment has otherwise the same configuration as that of the first embodiment depicted in FIG. 1.

The capacitor module 2 includes a plurality of capacitors C1-Cn and a plurality of switching devices S1-Sn connected in series with the capacitors C1-Cn, respectively, as depicted in FIG. 6. Capacitors like electric double-layer capacitors each having a large capacitance and quick charging and discharging capability are used as the capacitors C1-Cn, and the capacitors C1-Cn and the switching devices S1-Sn together constitute a plurality of series circuits which are connected parallel to each other. Among the switching devices S1-Sn, the switching device S1 is designated as a startup switching device, and a low-resistance resistor element R1 is connected parallel to the startup switching device S1 while high-resistance resistor elements RR2-RRn are connected parallel to the other switching devices S2-Sn, respectively.

Figure 7:
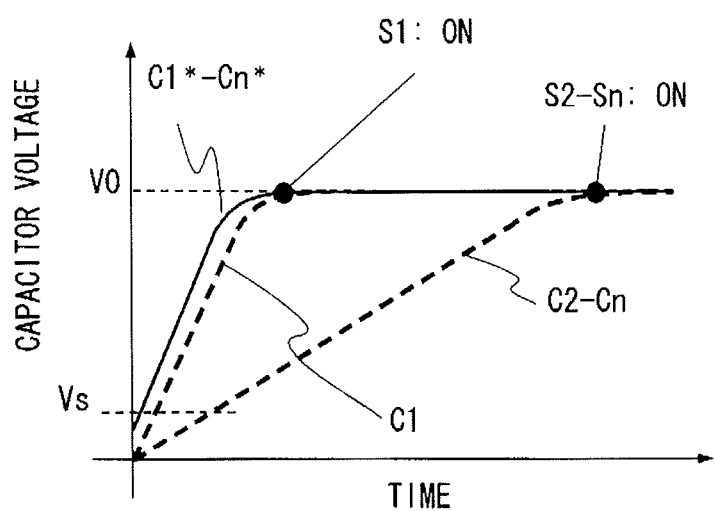
FIG. 7 is an operating characteristic diagram of a power storage apparatus according to the third embodiment.

Now, the working of the power storage apparatus 10 is described with reference to FIG. 7 which depicts time-related variations of voltages of the individual capacitors C1-Cn at startup of the generator 1.

The power storage control circuit 3 of the third embodiment operates in a manner similar to that of the first embodiment. Specifically, the power storage control circuit 3 detects a voltage of the capacitor module 2 and controllably drives the individual switching devices S1-Sn of the capacitor module 2 according to the detected voltage. If the voltage of the capacitor module 2 is lower than a specific voltage, that is, the startup voltage Vs of the generator 1, for example, when starting up the generator 1, the power storage control circuit 3 controls all of the switching devices S1-Sn to become OFF.

As a result, the individual capacitors C1-Cn are gradually charged by currents limited by the respective resistor elements (i.e., low-resistance resistor element R1 and high-resistance resistor elements RR2-RRn) from the electrical load 4. Since the low-resistance resistor element R1 is connected to the capacitor C1 and the high-resistance resistor elements RR2-RRn are connected to the other capacitors C2-Cn in this embodiment, the capacitor C1 is charged more quickly than the other capacitors C2-Cn. For the sake of explanation, voltages across series circuits made up of the capacitors C1-Cn and the respective resistor elements (i.e., low-resistance resistor element R1 and high-resistance resistor elements RR2-RRn) are now referred to as "virtual voltages" C1*-Cn*. Since the virtual voltages C1*-Cn* include voltage drops caused by the resistor elements (i.e., low-resistance resistor element R1 and high-resistance resistor elements RR2-RRn), it is possible to cause the virtual voltages C1*-Cn* to quickly increase. In this case, the virtual voltages C2*-Cn* rise as quickly as the voltage C1* even if the amounts of charges held by the capacitors C2-Cn are small. Therefore, it is possible to cause voltages of the capacitor module 2 (voltages C1*-Cn* in this case) to quickly rise up to the startup voltage Vs of the generator 1, thus producing a startup power source for starting the generator 1.

When the generator 1 is driven to operate subsequently, electric power output from the generator 1 is charged into the individual capacitors C1-Cn. Then, when the voltages of the capacitor module 2 become equal to or higher than the aforementioned specific voltage, the power storage control circuit 3 controls all of the switching devices S1-Sn to become ON. Consequently, the power storage apparatus 10 performs charging and discharging operations using all of the capacitors C1-Cn of the capacitor module 2 in a like fashion.

It is preferable that the individual switching devices S1-Sn be turned on after the voltages of the respective capacitors C1-Cn have sufficiently risen up to a level approximately equal to the virtual voltages C1*-Cn*, respectively. For this reason, the power storage control circuit 3 first controls the startup switching device S1 to become ON and then controls the other switching devices S2-Sn to become ON by detecting the voltages of the capacitors C1-Cn.

In this embodiment, the power storage control circuit 3 controls all of the switching devices S1-Sn to become OFF at startup of the generator 1 so that the capacitor C1 connected in series with the startup switching device S1 is quickly charged through the low-resistance resistor element R1 from the electrical load 4 with first priority given to the capacitor C1 and the other capacitors C2-Cn are gradually charged through the respective high-resistance resistor elements RR2-RRn. Since the capacitor C1 is charged regardless of conditions of the startup switching device S1 when the electrical load 4 has been started up, it is possible to increase the voltages of the capacitor module 2 more quickly than in the foregoing second embodiment and produce the startup power source for the generator 1 at high speed. Also, because the capacitors C2-Cn to which the high-resistance resistor elements RR2-RRn are connected, respectively, hold smaller amounts of charges, the above-described arrangement of the embodiment serves to deter deterioration of the capacitors C2-Cn, making it possible to prevent deterioration of the capacitor module 2 as a whole and lengthen the operational life of the power storage apparatus 10.

Furthermore, when the generator 1 is driven to operate subsequently, the power storage control circuit 3 controls all of the switching devices S1-Sn to become ON, thereby increasing the number of the parallel-connected capacitors C1-Cn. This serves to increase an overall capacitance of the capacitor module 2, making it possible to perform large-capacity charging and discharging operations. When the switching devices S1-Sn are turned from the OFF state to the ON state, the capacitors C2-Cn are already charged to a certain extent. Therefore, the arrangement of the present embodiment can bring the capacitor module 2 to a stably charged condition more quickly than in the earlier-described first embodiment. Also, compared to the forgoing second embodiment, voltage variations that occur when the individual switching devices S1-Sn are turned from the OFF state to the ON state are reduced because the resistor element R1 having a lower resistance value is parallel-connected to the startup switching device S1. This arrangement of the embodiment makes it possible perform control operation in a stabler fashion.

Incidentally, if the capacitance of the capacitor C1 connected to the startup switching device S1 is made smaller than the capacitances of the other capacitors C2-Cn in the foregoing first to third embodiments, it is possible to cause the voltages of the capacitor module 2 to increase more quickly.

Fourth Embodiment

Described hereinbelow is how the power storage apparatuses 10 of the foregoing first to third embodiments operate when the generator 1 is stopped.

When stopping the generator 1, the power storage control circuit 3 controls the startup switching device S1 to become OFF and the other switching devices S2-Sn to become ON. As a result, electric power held by the capacitor C1 which is series-connected to the startup switching device S1 is retained and electric power held by the other capacitors C2-Cn is discharged giving priority to the capacitors C2-Cn.

Then, when restarting the generator 1, the power storage control circuit 3 controls only the startup switching device S1 to become ON. Since the generator 1 can be restarted by using the electric power remaining in the capacitor C1 alone, it is possible to decrease startup time of the generator 1.

While the foregoing first to fourth embodiments have been described as having a single startup switching device S1, the embodiments may be so modified as to employ a plurality of startup switching devices if these switching devices are part of the switching devices S1-Sn provided in the capacitor module 2.

Various modifications and alterations of this invention will be apparent to those skilled in the art without departing from the scope and spirit of this invention, and it should be understood that this is not limited to the illustrative embodiments set forth herein.

What is claimed is:

1. A power storage apparatus connected between a generator and an electrical load, said power storage apparatus comprising:
a capacitor module including a plurality of capacitors and a plurality of switching devices which are connected in series with the capacitors, respectively, the capacitors and the switching devices together constituting a plurality of series circuits which are connected parallel to each other; and
a power storage control circuit which controllably drives the individual switching devices according to a voltage of said capacitor module and controls said capacitor module to store electric power;
wherein:
a particular one of the switching devices is designated as a startup switching device and, if the voltage of said capacitor module is lower than a specific voltage at startup of said generator, said power storage control circuit controls the startup switching device to become ON and the other switching devices to become OFF, whereby said electrical load first charges the capacitor which is connected in series with the startup switching device with priority given to the capacitor which is connected in series with the startup switching device, among the plurality of capacitors, to produce a startup power source for said generator, and
when said generator is driven to operate and the voltage of said capacitor module becomes equal to or higher than a specific voltage, said power storage control circuit controls the plurality of switching devices to become ON, thereby causing the capacitors of said capacitor module to perform charging and discharging operations.

2. The power storage apparatus according to claim 1, further comprising resistor elements which are connected parallel to the switching devices other than the startup switching device among the plurality of switching devices, respectively.

3. The power storage apparatus according to claim 1, wherein said power storage control circuit switches the switching device used as the startup switching device from one of the switching devices to another of the switching devices at specific time intervals.

4. The power storage apparatus according to claim 1, wherein capacitance of the capacitor which is connected in series with the startup switching device, among the plurality of capacitors, is made smaller than capacitances of the other capacitors.

5. The power storage apparatus according to claim 1, wherein said power storage control circuit controls the startup switching device to become OFF and the other switching devices to become ON, among the plurality of switching devices, when said generator is stopped, thereby causing the capacitor which is connected in series with the startup switching device to retain electric power.

6. A power storage apparatus connected between a generator and an electrical load, said power storage apparatus comprising:
a capacitor module including a plurality of capacitors and a plurality of switching devices which are connected in series with the capacitors, respectively, the capacitors and the switching devices together constituting a plurality of series circuits which are connected parallel to each other; and a power storage control circuit which controllably drives the individual switching devices according to a voltage of said capacitor module and controls said capacitor module to store electric power;

wherein:

a particular one of the switching devices is designated as a startup switching device, said power storage apparatus further comprising a low-resistance resistor element which is connected parallel to the startup switching device and high-resistance resistor elements which are connected parallel to the other switching devices, respectively, if the voltage of said capacitor module is lower than a specific voltage at startup of said generator, said power storage control circuit controls the plurality of switching devices to become OFF, whereby said electrical load first charges the capacitor which is connected in series with the startup switching device with priority given to the capacitor, among the plurality of capacitors, to produce a startup power source for said generator, and when said generator is driven to operate and the voltage of said capacitor module becomes equal to or higher than a specific voltage, said power storage control circuit controls the plurality of switching devices to become ON, thereby causing the capacitors of said capacitor module to perform charging and discharging operations.

7. The power storage apparatus according to claim 1, wherein said generator is a rotary electric machine used as a driving motor and is installed on a vehicle.

8. The power storage apparatus according to claim 6, wherein capacitance of the capacitor which is connected in series with the startup switching device, among the plurality of capacitors, is made smaller than capacitances of the other capacitors.

9. The power storage apparatus according to claim 6, wherein said power storage control circuit controls the startup switching device to become OFF and the other switching devices to become ON, among the plurality of switching devices, when said generator is stopped, thereby causing the capacitor which is connected in series with the startup switching device to retain electric power.

10. The power storage apparatus according to claim 1, wherein said generator is a rotary electric machine used also as a driving motor and is installed on a vehicle.

* * * * *